US012563211B2

(12) United States Patent
Keating et al.

(10) Patent No.: US 12,563,211 B2
(45) Date of Patent: Feb. 24, 2026

(54) VIDEO DATA ENCODING AND DECODING USING A CODED PICTURE BUFFER WHOSE SIZE IS DEFINED BY PARAMETER DATA

(71) Applicant: Sony Group Corporation, Tokyo (JP)

(72) Inventors: Stephen Mark Keating, Basingstoke (GB); Karl James Sharman, Basingstoke (GB); Adrian Richard Browne, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 95 days.

(21) Appl. No.: 17/911,657

(22) PCT Filed: Mar. 8, 2021

(86) PCT No.: PCT/GB2021/050573
§ 371 (c)(1),
(2) Date: Sep. 15, 2022

(87) PCT Pub. No.: WO2021/198639
PCT Pub. Date: Oct. 7, 2021

(65) Prior Publication Data
US 2023/0179783 A1     Jun. 8, 2023

(30) Foreign Application Priority Data
Apr. 3, 2020    (GB) ..................................... 2004954

(51) Int. Cl.
H04N 19/423          (2014.01)
H04N 19/172          (2014.01)

(52) U.S. Cl.
CPC ......... *H04N 19/423* (2014.11); *H04N 19/172* (2014.11)

(58) Field of Classification Search
None
See application file for complete search history.

(56) References Cited

U.S. PATENT DOCUMENTS 11,470,357 B2 * 10/2022 Deshpande ............ H04N 19/70
2014/0003525 A1 * 1/2014 Fuldseth ................ H04N 19/44
375/240.16

(Continued)

FOREIGN PATENT DOCUMENTS

| CN | 1145153 A | 3/1997 |
| CN | 105103549 A | 11/2015 |

(Continued)

OTHER PUBLICATIONS

International Search Report and Written Opinion mailed on May 3, 2021, received for PCT Application PCT/GB2021/050573, filed on Mar. 8, 2021, 12 pages.

(Continued)

*Primary Examiner* — Tyler W. Sullivan
(74) *Attorney, Agent, or Firm* — XSENSUS LLP

(57) ABSTRACT

An apparatus includes a video data decoder and a coded picture buffer to buffer successive portions of an input video data and provide a portion to the video data decoder for decoding. The video data decoder is responsive to parameter data associated with the input video data. The parameter data indicates, for a given input video data, an encoding level selected from a plurality of encoding levels. Each level defines at least a maximum luminance picture size, a minimum compression ratio, and a maximum value of the coded picture buffer size. For each encoding level of the plurality of encoding levels, the maximum value of the coded picture buffer size is greater than or equal to the number of bits required to represent a picture at the maximum luminance picture size when encoded according to the minimum compression ratio.

20 Claims, 12 Drawing Sheets

| Level | Max luma picture size MaxLumaPs (samples) | Example max luma size | Max CPB size MaxCPB (CpbVcl Factor or CpbNal Factor bits) | Max CPB size MaxCPB Main444_10 (bits) | Min compression ratio MinCrBase | Max coded luma picture size Main444_10 (bits @30bits/sample) | Min coded pictures in CPB Main444_10 |
|---|---|---|---|---|---|---|---|
| | | | Main tier | Main tier | Main tier | Main tier | Main tier |
| 1 | 36,864 | | 350 | 875,000 | 2 | 737,280 | 1.2 |
| 2 | 122,880 | | 1,500 | 3,750,000 | 2 | 2,457,600 | 1.5 |
| 2.1 | 245,760 | | 3,000 | 7,500,000 | 2 | 4,915,200 | 1.5 |
| 3 | 552,960 | | 6,000 | 15,000,000 | 2 | 11,059,200 | 1.4 |
| 3.1 | 983,040 | | 10,000 | 25,000,000 | 2 | 19,660,800 | 1.3 |
| 4 | 2,228,224 | 2048x1088 | 12,000 | 30,000,000 | 4 | 22,282,240 | 1.3 |
| 4.1 | 2,228,224 | 2048x1088 | 20,000 | 50,000,000 | 4 | 22,282,240 | 2.2 |
| 5 | 8,912,896 | 4096x2176 | 25,000 | 62,500,000 | 6 | 59,419,307 | 1.1 |
| 5.1 | 8,912,896 | 4096x2176 | 40,000 | 100,000,000 | 8 | 44,564,480 | 2.2 |
| 5.2 | 8,912,896 | 4096x2176 | 60,000 | 150,000,000 | 8 | 44,564,480 | 3.4 |
| 6 | 35,651,584 | 8192x4352 | 80,000 | 200,000,000 | 8 | 178,257,920 | 1.1 |
| 6.1 | 35,651,584 | 8192x4352 | 120,000 | 300,000,000 | 8 | 178,257,920 | 1.7 |
| 6.2 | 35,651,584 | 8192x4352 | 240,000 | 600,000,000 | 6 | 237,677,227 | 2.5 |

(56) References Cited

U.S. PATENT DOCUMENTS

| | | | | |
|---|---|---|---|---|
| 2014/0016711 A1* | 1/2014 | Rodriguez | ........... | H04N 19/423 |
| | | | | 375/240.26 |
| 2015/0319462 A1* | 11/2015 | Ramasubramonian | ...................... | |
| | | | | H04N 19/70 |
| | | | | 375/240.29 |
| 2016/0295217 A1 | 10/2016 | Suzuki et al. | | |
| 2017/0006300 A1* | 1/2017 | Tsukuba | ................. | H04N 19/36 |
| 2023/0048070 A1* | 2/2023 | Deshpande | ............ | H04N 19/30 |
| 2024/0406458 A1* | 12/2024 | Deshpande | ............ | H04N 19/44 |

FOREIGN PATENT DOCUMENTS

| | | | | |
|---|---|---|---|---|
| JP | 2015126507 A | 7/2015 | | |
| JP | 7694578 B2 | 6/2025 | | |
| WO | WO-2015105003 A1 | 7/2015 | | |
| WO | WO-2021134052 A1 * | 7/2021 | ........... | H04N 19/119 |

OTHER PUBLICATIONS

Bross et al., "Versatile Video Coding Draft 8", Joint Video Experts Team (JVET) of ITU-T SG 16 WP 3 and ISO/IEC JTC 1/SC 29, JVET-Q2001-vE, Jan. 7-17, 2020, 512 pages.

Sullivan et al., "Text of ISO/IEC 14496-10 Advanced Video Coding 3rd Edition" 69. MPEG Meeting, Jul. 2004, 330 pages, Draft Third Edition of ISO/IEC 14496-10 (E), Redmond, WA, USAM 330 pages.

Series H: Audiovisual and Multimedia Systems Infrastructure of audiovisual services—Coding of moving video High efficiency video coding: Recommendation ITU-T H.265, Dec. 2016, 664 pages.

Madhukar Budagavi; et al. High Efficiency Video Coding (HEVC) Algorithms and Architectures, chapter 3, ISBN 978-3-319-06894-7; 2014, 384, pages.

David Flynn et al., "Overview of the Range Extensions for the HEVC Standard: Tools, Profiles, and Performance", [online], Published in: IEEE Transactions on Circuits and Systems for Video Technology, vol. 26 , Issue: 1, Jan. 2016.

Steve Keating et al., "AHG9: Coded Picture Buffer sizes and MinCr in VVC", [online], JVET-R0244 (JVET-R0244.docx), Apr. 2020.

Teruhiko Suzuki et al., "On MinCR", [online], JCTVC-P0044 (JCTVC-P0044_r2.doc), Jan. 2014.

Bross B et al: "Versatile Video Coding Editorial Refinements on Draft 1O", 20. JVET Meeting; Oct. 7, 2020-Oct. 16, 2020: Teleconference; (The Joint Video Exploration Team of ISO/IEC JTC1/SC29/WG11 and ITU-T SG.16 ), No. JVE•LT2001 Oct. 30, 2020 (Oct. 30, 2020), XP030289993, Retrieved from the Internet [retrieved on Oct. 30, 2020]: URL:http://phenix.int-evry.fr/jvet/doc_end_user/documents/20_ Teleconference/wg11 /JVET-T2001-v1 .zip JVET-T2001-v1 .docx cited in the application.

Text of ISO/IEC DIS 23090-3, "Part 3 Versatile Video Coding", Jan. 12, 2020 (Jan. 12, 2020), XP030225573.

ITU-T H.264, "Advanced video coding for generic audiovisual services," Study group 16 (Jun. 1, 2019), 856 pgs.

* cited by examiner

Related Art

| Level | MaxLuma picture size MaxLumaPs (samples) | MaxCPB size MaxCPB (CpbVclFactor or CpbNalFactorbits) Main tier | MaxCPB size MaxCPB (CpbVclFactor or CpbNalFactorbits) High tier | Max slices per picture MaxSlicesPerPicture | Max # of tile rows MaxTileRows | Max # of tile columns MaxTileCols |
|---|---|---|---|---|---|---|
| 1 | 36 864 | 350 | ° | 16 | 1 | 1 |
| 2 | 122 880 | 1 500 | ° | 16 | 1 | 1 |
| 2.1 | 245 760 | 3 000 | ° | 20 | 1 | 1 |
| 3 | 552 960 | 6 000 | ° | 30 | 2 | 2 |
| 3.1 | 983 040 | 10 000 | ° | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

FIG. 12

Related Art

| Level | MaxLuma sample rate MaxLumaSr (samples/sec) | Max bit rate MaxBR (BrVclFactor or BrNalFactor bits/s) | | Min compression ratio MinCrBase | |
|---|---|---|---|---|---|
| | | Main tier | High tier | Main tier | High tier |
| 1 | 552 960 | 128 | ° | 2 | 2 |
| 2 | 3 686 400 | 1 500 | ° | 2 | 2 |
| 2.1 | 7 372 800 | 3 000 | ° | 2 | 2 |
| 3 | 16 588 800 | 6 000 | ° | 2 | 2 |
| 3.1 | 33 177 600 | 10 000 | ° | 2 | 2 |
| 4 | 66 846 720 | 12 000 | 30 000 | 4 | 4 |
| 4.1 | 133 693 440 | 20 000 | 50 000 | 4 | 4 |
| 5 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 6 | 4 |

FIG. 13

Related Art

| Profile | CpbVclFactor | CpbNalFactor | FormatCapabilityFactor | MinCrScaleFactor |
|---|---|---|---|---|
| Main 10 | 1'000 | 1'100 | 1.875 | 1.0 |
| Main 4:4:4 10 | 2'500 | 2'750 | 3.750 | 0.5 |

FIG. 14

| Level | Max luma picture size MaxLumaPs (samples) | Example max luma size | Max CPB size MaxCPB (CpbVclFactor or CpbNalFactor bits) | Max CPB size MaxCPB Main10 (bits) | Min compression ratio MinCrBase | Max coded picture size Main10 (bits @ 15bits/sample) | Min coded pictures in CPB Main10 |
|---|---|---|---|---|---|---|---|
| | | | Main tier | Main tier | Main tier | Main tier | Main tier |
| 1 | 36,864 | | 350 | 350,000 | 2 | 276,480 | 1.3 |
| 2 | 122,880 | | 1,500 | 1,500,000 | 2 | 921,600 | 1.6 |
| 2.1 | 245,760 | | 3,000 | 3,000,000 | 2 | 1,843,200 | 1.6 |
| 3 | 552,960 | | 6,000 | 6,000,000 | 2 | 4,147,200 | 1.4 |
| 3.1 | 983,040 | | 10,000 | 10,000,000 | 2 | 7,372,800 | 1.4 |
| 4 | 2,228,224 | 2048x1088 | 12,000 | 12,000,000 | 4 | 8,355,840 | 1.4 |
| 4.1 | 2,228,224 | 2048x1088 | 20,000 | 20,000,000 | 4 | 8,355,840 | 2.4 |
| 5 | 8,912,896 | 4096x2176 | 25,000 | 25,000,000 | 6 | 22,282,240 | 1.1 |
| 5.1 | 8,912,896 | 4096x2176 | 40,000 | 40,000,000 | 8 | 16,711,680 | 2.4 |
| 5.2 | 8,912,896 | 4096x2176 | 60,000 | 60,000,000 | 8 | 16,711,680 | 3.6 |
| 6 | 35,651,584 | 8192x4352 | 60,000 | 60,000,000 | 8 | 66,846,720 | 0.9 |
| 6.1 | 35,651,584 | 8192x4352 | 120,000 | 120,000,000 | 8 | 66,846,720 | 1.8 |
| 6.2 | 35,651,584 | 8192x4352 | 240,000 | 240,000,000 | 6 | 89,128,960 | 2.7 |

FIG. 15

| Level | Max luma picture size MaxLumaPs (samples) | Example max luma size | Max CPB size MaxCPB (CpbVclFactor or CpbNalFactor bits) | Max CPB size MaxCPB Main444_10 (bits) | Min compression ratio MinCrBase | Max coded picture size Main444_10 (bits @30bits/sample) | Min coded pictures in CPB Main444_10 |
|---|---|---|---|---|---|---|---|
| | | | Main tier | Main tier | Main tier | Main tier | Main tier |
| 1 | 36,864 | | 350 | 875,000 | 2 | 1,105,920 | 0.8 |
| 2 | 122,880 | | 1,500 | 3,750,000 | 2 | 3,686,400 | 1.0 |
| 2.1 | 245,760 | | 3,000 | 7,500,000 | 2 | 7,372,800 | 1.0 |
| 3 | 552,960 | | 6,000 | 15,000,000 | 2 | 16,588,800 | 0.9 |
| 3.1 | 983,040 | | 10,000 | 25,000,000 | 2 | 29,491,200 | 0.8 |
| 4 | 2,228,224 | 2048x1088 | 12,000 | 30,000,000 | 4 | 33,423,360 | 0.9 |
| 4.1 | 2,228,224 | 2048x1088 | 20,000 | 50,000,000 | 4 | 33,423,360 | 1.5 |
| 5 | 8,912,896 | 4096x2176 | 25,000 | 62,500,000 | 6 | 89,128,960 | 0.7 |
| 5.1 | 8,912,896 | 4096x2176 | 40,000 | 100,000,000 | 8 | 66,846,720 | 1.5 |
| 5.2 | 8,912,896 | 4096x2176 | 60,000 | 150,000,000 | 8 | 66,846,720 | 2.2 |
| 6 | 35,651,584 | 8192x4352 | 60,000 | 150,000,000 | 8 | 267,386,880 | 0.6 |
| 6.1 | 35,651,584 | 8192x4352 | 120,000 | 300,000,000 | 8 | 267,386,880 | 1.1 |
| 6.2 | 35,651,584 | 8192x4352 | 240,000 | 600,000,000 | 6 | 356,515,840 | 1.7 |

FIG. 16

| Level | Max luma picture size MaxLumaPs (samples) | Example max luma size | Max CPB size MaxCPB (CpbVcl Factor or CpbNal Factor bits) | Max CPB size MaxCPB Main10 (bits) | Min compression ratio MinCrBase | Max coded luma picture size Main10 (bits @15bits/sample) | Min coded pictures in CPB Main10 |
|---|---|---|---|---|---|---|---|
| | | | Main tier | Main tier | Main tier | Main tier | Main tier |
| 1 | 36,864 | | 350 | 350,000 | 2 | 276,480 | 1.3 |
| 2 | 122,880 | | 1,500 | 1,500,000 | 2 | 921,600 | 1.6 |
| 2.1 | 245,760 | | 3,000 | 3,000,000 | 2 | 1,843,200 | 1.6 |
| 3 | 552,960 | | 6,000 | 6,000,000 | 2 | 4,147,200 | 1.4 |
| 3.1 | 983,040 | | 10,000 | 10,000,000 | 2 | 7,372,800 | 1.4 |
| 4 | 2,228,224 | 2048x1088 | 12,000 | 12,000,000 | 4 | 8,355,840 | 1.4 |
| 4.1 | 2,228,224 | 2048x1088 | 20,000 | 20,000,000 | 4 | 8,355,840 | 2.4 |
| 5 | 8,912,896 | 4096x2176 | 25,000 | 25,000,000 | 6 | 22,282,240 | 1.1 |
| 5.1 | 8,912,896 | 4096x2176 | 40,000 | 40,000,000 | 8 | 16,711,680 | 2.4 |
| 5.2 | 8,912,896 | 4096x2176 | 60,000 | 60,000,000 | 8 | 16,711,680 | 3.6 |
| 6 | 35,651,584 | 8192x4352 | 80,000 | 80,000,000 | 8 | 66,846,720 | 1.2 |
| 6.1 | 35,651,584 | 8192x4352 | 120,000 | 120,000,000 | 8 | 66,846,720 | 1.8 |
| 6.2 | 35,651,584 | 8192x4352 | 240,000 | 240,000,000 | 6 | 89,128,960 | 2.7 |

FIG. 17

| Level | Max luma picture size MaxLumaPs (samples) | Example max luma size | Max CPB size MaxCPB (CpbVcl Factor or CpbNal Factor bits) | Max CPB size MaxCPB Main444_10 (bits) | Min compression ratio MinCrBase | Max coded luma picture size Main444_10 (bits @30bits/sample) | Min coded pictures in CPB Main444_10 |
|---|---|---|---|---|---|---|---|
| | | | Main tier | Main tier | Main tier | Main tier | Main tier |
| 1 | 36,864 | | 350 | 875,000 | 2 | 737,280 | 1.2 |
| 2 | 122,880 | | 1,500 | 3,750,000 | 2 | 2,457,600 | 1.5 |
| 2.1 | 245,760 | | 3,000 | 7,500,000 | 2 | 4,915,200 | 1.5 |
| 3 | 552,960 | | 6,000 | 15,000,000 | 2 | 11,059,200 | 1.4 |
| 3.1 | 983,040 | | 10,000 | 25,000,000 | 2 | 19,660,800 | 1.3 |
| 4 | 2,228,224 | 2048x1088 | 12,000 | 30,000,000 | 4 | 22,282,240 | 1.3 |
| 4.1 | 2,228,224 | 2048x1088 | 20,000 | 50,000,000 | 4 | 22,282,240 | 2.2 |
| 5 | 8,912,896 | 4096x2176 | 25,000 | 62,500,000 | 6 | 59,419,307 | 1.1 |
| 5.1 | 8,912,896 | 4096x2176 | 40,000 | 100,000,000 | 8 | 44,564,480 | 2.2 |
| 5.2 | 8,912,896 | 4096x2176 | 60,000 | 150,000,000 | 8 | 44,564,480 | 3.4 |
| 6 | 35,651,584 | 8192x4352 | 80,000 | 200,000,000 | 8 | 178,257,920 | 1.1 |
| 6.1 | 35,651,584 | 8192x4352 | 120,000 | 300,000,000 | 8 | 178,257,920 | 1.7 |
| 6.2 | 35,651,584 | 8192x4352 | 240,000 | 600,000,000 | 6 | 237,677,227 | 2.5 |

FIG. 18

| Profile | CpbVclFactor | CpbNalFactor | FormatCapabilityFactor | MinCrScaleFactor |
|---|---|---|---|---|
| Main 10 | 1 000 | 1 100 | 1.875 | 1.0 |
| Main 4:4:4 10 | 2 000 | 2 200 | 3.750 | 1.0 |

FIG. 19

| Level | Max luma picture size MaxLumaPs (samples) | Example max luma size | Max CPB size MaxCPB (CpbVcl Factor or CpbNal Factor bits) | Max CPB size MaxCPB Main444_10 (bits) | Min compression ratio MinCrBase | Max coded luma picture size Main444_10 (bits @30bits/sample) | Min coded pictures in CPB Main444_10 |
|---|---|---|---|---|---|---|---|
|  |  |  | Main tier | Main tier | Main tier | Main tier | Main tier |
| 1 | 36,864 |  | 350 | 700,000 | 2 | 552,960 | 1.3 |
| 2 | 122,880 |  | 1,500 | 3,000,000 | 2 | 1,843,200 | 1.6 |
| 2.1 | 245,760 |  | 3,000 | 6,000,000 | 2 | 3,686,400 | 1.6 |
| 3 | 552,960 |  | 6,000 | 12,000,000 | 2 | 8,294,400 | 1.4 |
| 3.1 | 983,040 |  | 10,000 | 20,000,000 | 2 | 14,745,600 | 1.4 |
| 4 | 2,228,224 | 2048x1088 | 12,000 | 24,000,000 | 4 | 16,711,680 | 1.4 |
| 4.1 | 2,228,224 | 2048x1088 | 20,000 | 40,000,000 | 4 | 16,711,680 | 2.4 |
| 5 | 8,912,896 | 4096x2176 | 25,000 | 50,000,000 | 6 | 44,564,480 | 1.1 |
| 5.1 | 8,912,896 | 4096x2176 | 40,000 | 80,000,000 | 8 | 33,423,360 | 2.4 |
| 5.2 | 8,912,896 | 4096x2176 | 60,000 | 120,000,000 | 8 | 33,423,360 | 3.6 |
| 6 | 35,651,584 | 8192x4352 | 80,000 | 160,000,000 | 8 | 133,693,440 | 1.2 |
| 6.1 | 35,651,584 | 8192x4352 | 120,000 | 240,000,000 | 8 | 133,693,440 | 1.8 |
| 6.2 | 35,651,584 | 8192x4352 | 240,000 | 480,000,000 | 6 | 178,257,920 | 2.7 |

FIG. 20

VIDEO DATA ENCODING AND DECODING USING A CODED PICTURE BUFFER WHOSE SIZE IS DEFINED BY PARAMETER DATA

CROSS-REFERENCE TO RELATED APPLICATIONS

The present application is based on PCT filing PCT/GB2021/050573, filed Mar. 8, 2021, which claims priority to GB 2004954.0, filed Apr. 3, 2020, the entire contents of each are incorporated herein by reference.

BACKGROUND

Field

This disclosure relates to video data encoding and decoding.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

There are several systems, such as video or image data encoding and decoding systems which involve transforming video data into a frequency domain representation, quantising the frequency domain coefficients and then applying some form of entropy encoding to the quantised coefficients. This can achieve compression of the video data. A corresponding decoding or decompression technique is applied to recover a reconstructed version of the original video data.

SUMMARY

The present disclosure addresses or mitigates problems arising from this processing.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 12 to 20 are tables relating to encoding levels; and

DESCRIPTION OF THE PREFERRED EMBODIMENTS

Figures 1, 2, 3, 4, 5, 6:
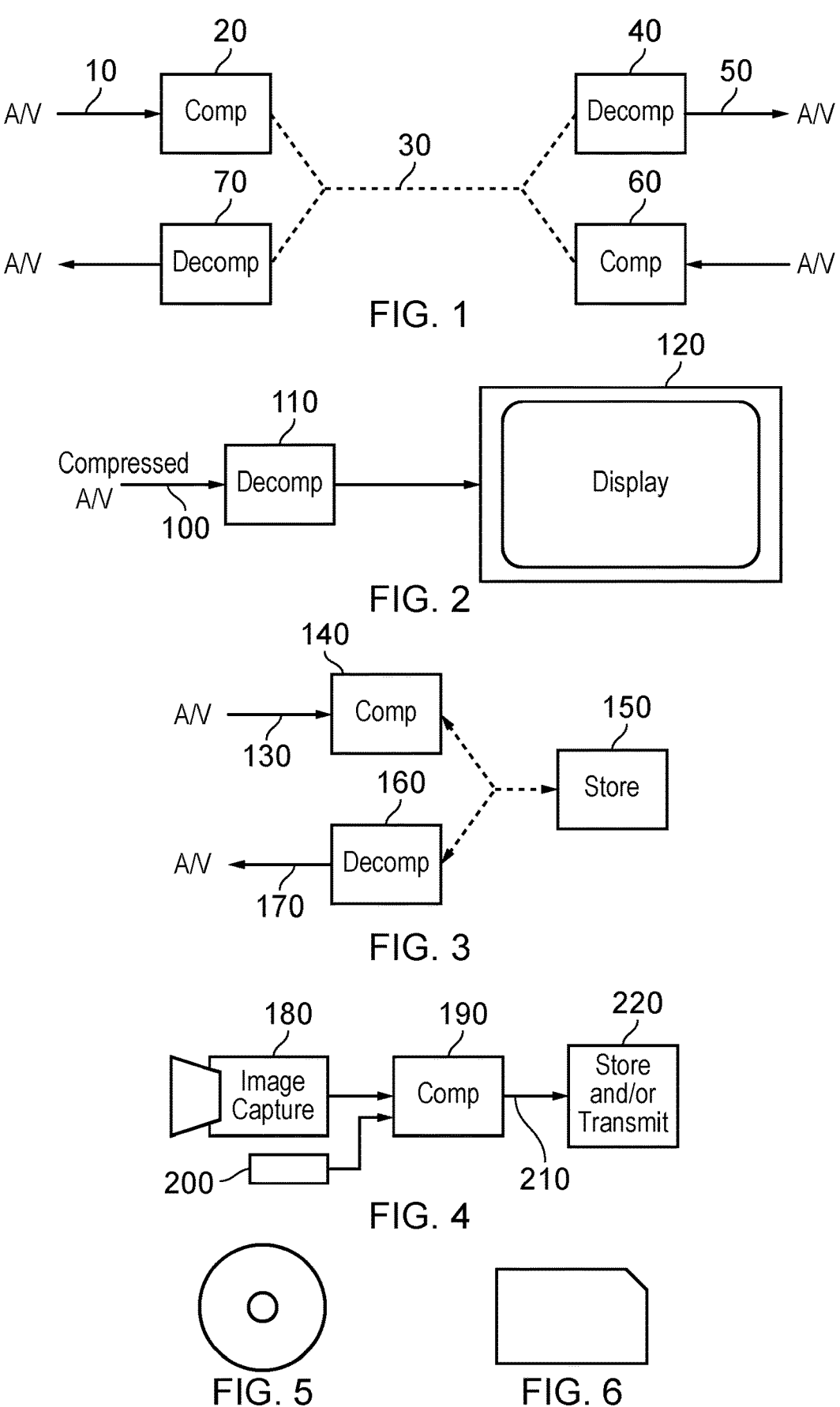
FIG. 1 schematically illustrates an audio/video (A/V) data transmission and reception system using video data compression and decompression.
FIG. 2 schematically illustrates a video display system using video data decompression.
FIG. 3 schematically illustrates an audio/video storage system using video data compression and decompression.
FIG. 4 schematically illustrates a video camera using video data compression.
FIGS. 5 and 6 schematically illustrate storage media.

Referring now to the drawings, FIGS. 1-4 are provided to give schematic illustrations of apparatus or systems making use of the compression and/or decompression apparatus to be described below in connection with embodiments of the present technology.

All of the data compression and/or decompression apparatus to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory data storage media by which such software and/or firmware are stored or otherwise provided, are considered as embodiments of the present technology.

FIG. 1 schematically illustrates an audio/video data transmission and reception system using video data compression and decompression. In this example, the data values to be encoded or decoded represent image data.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and compression apparatus 60 can form another node of the transmission link. Of course, in instances where the transmission link is uni-directional, only one of the nodes would require a compression apparatus and the other node would only require a decompression apparatus.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 maybe provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the storage device 150 and passed to a decompression apparatus 160 for decompression to provide an output audio/video signal 170.

It will be appreciated that the compressed or encoded signal, and a storage medium such as a machine-readable non-transitory storage medium, storing that signal, are considered as embodiments of the present technology.

FIG. 4 schematically illustrates a video camera using video data compression. In FIG. 4, an image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression and decompression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

FIG. 4 therefore provides an example of a video capture apparatus comprising an image sensor and an encoding apparatus of the type to be discussed below. FIG. 2 therefore provides an example of a decoding apparatus of the type to be discussed below and a display to which the decoded images are output.

A combination of FIGS. 2 and 4 may provide a video capture apparatus comprising an image sensor 180 and encoding apparatus 190, decoding apparatus 110 and a display 120 to which the decoded images are output.

FIGS. 5 and 6 schematically illustrate storage media, which store (for example) the compressed data generated by the apparatus 20, 60, the compressed data input to the apparatus 110 or the storage media or stages 150, 220. FIG. 5 schematically illustrates a disc storage medium such as a magnetic or optical disc, and FIG. 6 schematically illustrates a solid state storage medium such as a flash memory. Note that FIGS. 5 and 6 can also provide examples of non-transitory machine-readable storage media which store computer software which, when executed by a computer, causes the computer to carry out one or more of the methods to be discussed below.

Therefore, the above arrangements provide examples of video storage, capture, transmission or reception apparatuses embodying any of the present techniques.

Figure 7:
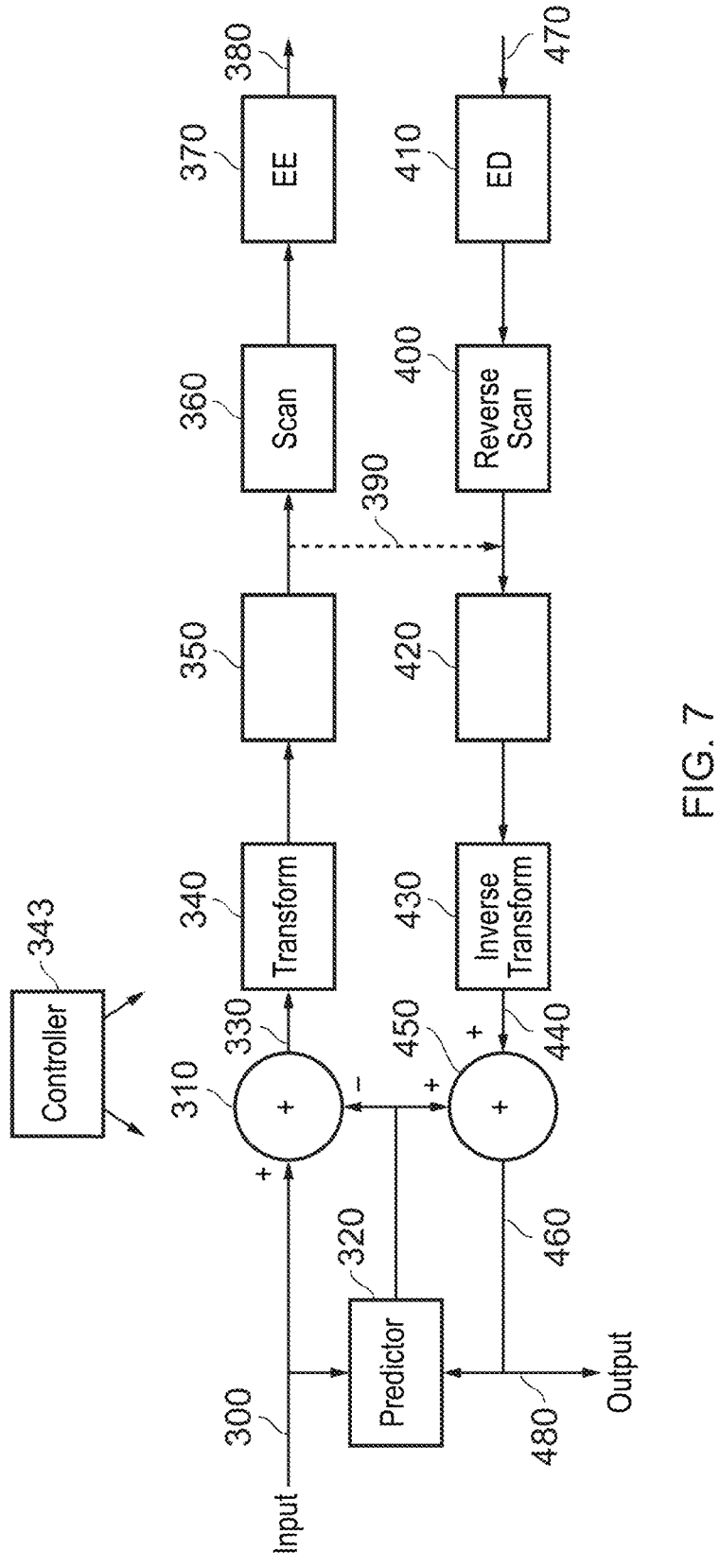
FIG. 7 provides a schematic overview of a video data compression and decompression apparatus.

FIG. 7 provides a schematic overview of a video or image data compression (encoding) and decompression (decoding) apparatus, for encoding and/or decoding video or image data representing one or more images.

A controller 343 controls the overall operation of the apparatus and, in particular when referring to a compression mode, controls a trial encoding processes by acting as a selector to select various modes of operation such as block sizes and shapes, and whether the video data is to be encoded losslessly or otherwise. The controller is considered to form part of the image encoder or image decoder (as the case may be). Successive images of an input video signal 300 are supplied to an adder 310 and to an image predictor 320. The image predictor 320 will be described below in more detail with reference to FIG. 8. The image encoder or decoder (as the case may be) plus the intra-image predictor of FIG. 8 may use features from the apparatus of FIG. 7. This does not mean that the image encoder or decoder necessarily requires every feature of FIG. 7 however.

The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and predicted images.

One reason why a residual image signal is generated is as follows. The data coding techniques to be described, that is to say the techniques which will be applied to the residual image signal, tend to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well such that the predicted image content is similar to the image content to be encoded, the expectation is that the residual image data will contain less information (less energy) than the input image and so will be easier to encode into a small amount of encoded data.

Therefore, encoding (using the adder 310) involves predicting an image region for an image to be encoded; and generating a residual image region dependent upon the difference between the predicted image region and a corresponding region of the image to be encoded. In connection with the techniques to be discussed below, the ordered array of data values comprises data values of a representation of the residual image region. Decoding involves predicting an image region for an image to be decoded; generating a residual image region indicative of differences between the predicted image region and a corresponding region of the image to be decoded; in which the ordered array of data values comprises data values of a representation of the residual image region; and combining the predicted image region and the residual image region.

The remainder of the apparatus acting as an encoder (to encode the residual or difference image) will now be described.

The residual image data 330 is supplied to a transform unit or circuitry 340 which generates a discrete cosine transform (DCT) representation of blocks or regions of the residual image data. The DCT technique itself is well known and will not be described in detail here. Note also that the use of DCT is only illustrative of one example arrangement. Other transforms which might be used include, for example, the discrete sine transform (DST). A transform could also comprise a sequence or cascade of individual transforms, such as an arrangement in which one transform is followed (whether directly or not) by another transform. The choice of transform may be determined explicitly and/or be dependent upon side information used to configure the encoder and decoder. In other examples a so-called "transform skip" mode can selectively be used in which no transform is applied.

Therefore, in examples, an encoding and/or decoding method comprises predicting an image region for an image to be encoded; and generating a residual image region dependent upon the difference between the predicted image region and a corresponding region of the image to be encoded; in which the ordered array of data values (to be discussed below) comprises data values of a representation of the residual image region.

The output of the transform unit 340, which is to say (in an example), a set of DCT coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called up-right diagonal scanning order.

The scanning order can be different, as between transform-skip blocks and transform blocks (blocks which have undergone at least one spatial frequency transformation).

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, whether the compressed data was transformed or transform-skipped or the like, provides a compressed output video signal 380.

However, a return path 390 is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered (in at least some examples) to be "lossless", which is to say that it can be reversed to arrive at exactly the same data which was first supplied to the entropy encoder 370. So, in such examples the return path can be implemented before the entropy encoding stage. Indeed, the scanning process carried out by the scan unit 360 is also considered lossless, so in the present embodiment the return path 390 is from the output of the quantiser 350 to the input of a complimentary inverse quantiser 420. In instances where loss or potential loss is introduced by a stage, that stage (and its inverse) may be included in the feedback loop formed by the return path. For example, the entropy encoding stage can at least in principle be made lossy, for example by techniques in which bits are encoded within parity information. In such an instance, the entropy encoding and decoding should form part of the feedback loop.

In general terms, an entropy decoder 410, the reverse scan unit 400, an inverse quantiser 420 and an inverse transform unit or circuitry 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460 (although this may be subject to so-called loop filtering and/or other filtering before being output—see below). This forms one input to the image predictor 320, as will be described below.

Turning now to the decoding process applied to decompress a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. So, at the decoder side, the decoder reconstructs a version of the residual image and then applies this (by the adder 450) to the predicted version of the image (on a block by block basis) so as to decode each block. In straightforward terms, the output 460 of the adder 450 forms the output decompressed video signal 480 (subject to the filtering processes discussed below). In practice, further filtering may optionally be applied (for example, by a loop filter 565 shown in FIG. 8 but omitted from FIG. 7 for clarity of the higher level diagram of FIG. 7) before the signal is output.

Figure 8:
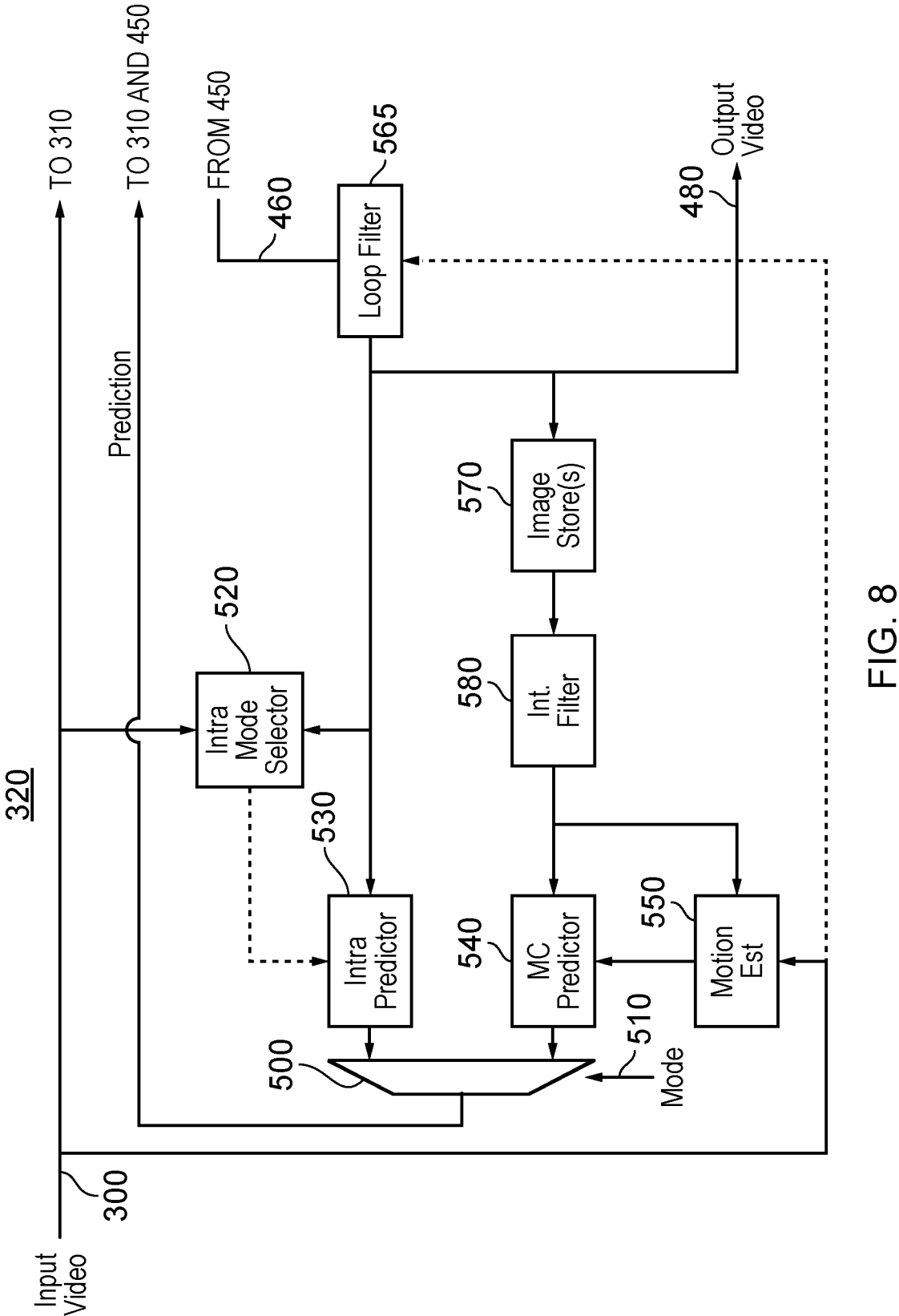
FIG. 8 schematically illustrates a predictor.

The apparatus of FIGS. 7 and 8 can act as a compression (encoding) apparatus or a decompression (decoding) apparatus. The functions of the two types of apparatus substantially overlap. The scan unit 360 and entropy encoder 370 are not used in a decompression mode, and the operation of the predictor 320 (which will be described in detail below) and other units follow mode and parameter information contained in the received compressed bit-stream rather than generating such information themselves.

FIG. 8 schematically illustrates the generation of predicted images, and in particular the operation of the image predictor 320.

There are two basic modes of prediction carried out by the image predictor 320: so-called intra-image prediction and so-called inter-image, or motion-compensated (MC), prediction. At the encoder side, each involves detecting a prediction direction in respect of a current block to be predicted, and generating a predicted block of samples according to other samples (in the same (intra) or another (inter) image). By virtue of the units 310 or 450, the difference between the predicted block and the actual block is encoded or applied so as to encode or decode the block respectively.

(At the decoder, or at the reverse decoding side of the encoder, the detection of a prediction direction may be in response to data associated with the encoded data by the encoder, indicating which direction was used at the encoder. Or the detection may be in response to the same factors as those on which the decision was made at the encoder).

Intra-image prediction bases a prediction of the content of a block or region of the image on data from within the same image. This corresponds to so-called I-frame encoding in other video compression techniques. In contrast to I-frame encoding, however, which involves encoding the whole image by intra-encoding, in the present embodiments the choice between intra- and inter-encoding can be made on a block-by-block basis, though in other embodiments the choice is still made on an image-by-image basis.

Motion-compensated prediction is an example of inter-image prediction and makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

A technique known as "block copy" prediction is in some respects a hybrid of the two, as it uses a vector to indicate a block of samples at a position displaced from the currently predicted block within the same image, which should be copied to form the currently predicted block.

Returning to FIG. 8, two image prediction arrangements (corresponding to intra- and inter-image prediction) are shown, the results of which are selected by a multiplexer 500 under the control of a mode signal 510 (for example, from the controller 343) so as to provide blocks of the predicted image for supply to the adders 310 and 450. The choice is made in dependence upon which selection gives the lowest "energy" (which, as discussed above, may be considered as information content requiring encoding), and the choice is signalled to the decoder within the encoded output data-stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area. In other examples, a trial encoding can be carried out for each selection or potential selection, with a choice then being made according to the cost of each potential selection in terms of one or both of the number of bits required for encoding and distortion to the picture.

The actual prediction, in the intra-encoding system, is made on the basis of image blocks received as part of the signal 460 (as filtered by loop filtering; see below), which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

Accordingly, the units 530 and 540 (operating with the estimator 550) each act as detectors to detect a prediction direction in respect of a current block to be predicted, and as a generator to generate a predicted block of samples (forming part of the prediction passed to the units 310 and 450) according to other samples defined by the prediction direction.

The processing applied to the signal 460 will now be described.

Firstly, the signal may be filtered by a so-called loop filter 565. Various types of loop filters may be used. One technique involves applying a "deblocking" filter to remove or at least tend to reduce the effects of the block-based processing carried out by the transform unit 340 and subsequent operations. A further technique involving applying a so-called sample adaptive offset (SAO) filter may also be used. In general terms, in a sample adaptive offset filter, filter parameter data (derived at the encoder and communicated to the decoder) defines one or more offset amounts to be selectively combined with a given intermediate video sample (a sample of the signal 460) by the sample adaptive offset filter in dependence upon a value of: (i) the given intermediate video sample; or (ii) one or more intermediate video samples having a predetermined spatial relationship to the given intermediate video sample.

Also, an adaptive loop filter is optionally applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data-stream.

Techniques to be discussed below relate to the handling of parameter data relating to the operation of filters. The actual filtering operations (such as SAO filtering) may use otherwise known techniques.

The filtered output from the loop filter unit 565 in fact forms the output video signal 480 when the apparatus is operating as a decompression apparatus. It is also buffered in one or more image or frame stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images may be passed to an interpolation filter 580 which generates a higher resolution version of the stored images; in this example, intermediate samples (sub-samples) are generated such that the resolution of the interpolated image is output by the interpolation filter 580 is 4 times (in each dimension) that of the images stored in the image stores 570 for the luminance channel of 4:2:0 and 8 times (in each dimension) that of the images stored in the image stores 570 for the chrominance channels of 4:2:0. The interpolated images are passed as an input to the motion estimator 550 and also to the motion compensated predictor 540.

The way in which an image is partitioned for compression processing will now be described. At a basic level, an image to be compressed is considered as an array of blocks or regions of samples. The splitting of an image into such blocks or regions can be carried out by a decision tree, such as that described in SERIES H: AUDIOVISUAL AND MULTIMEDIA SYSTEMS Infrastructure of audiovisual services—Coding of moving video High efficiency video coding Recommendation ITU-T H.265 December 2016. Also: High Efficiency Video Coding (HEVC) Algorithms and Architectures, chapter 3, Editors: Madhukar Budagavi, Gary J. Sullivan, Vivienne Sze; ISBN 978-3-319-06894-7; 2014 which are incorporated herein in their respective entireties by reference. Further background information is provided in [1] "Versatile Video Coding (Draft 8)", JVET-Q2001-vE, B. Bross, J. Chen, S. Liu and Y-K. Wang, which is also incorporated herein in its entirety by reference.

In some examples, the resulting blocks or regions have sizes and, in some cases, shapes which, by virtue of the decision tree, can generally follow the disposition of image features within the image. This in itself can allow for an improved encoding efficiency because samples representing or following similar image features would tend to be grouped together by such an arrangement. In some examples, square blocks or regions of different sizes (such as 4×4 samples up to, say, 64×64 or larger blocks) are available for selection. In other example arrangements, blocks or regions of different shapes such as rectangular blocks (for example, vertically or horizontally oriented) can be used. Other non-square and non-rectangular blocks are envisaged. The result of the division of the image into such blocks or regions is (in at least the present examples) that each sample of an image is allocated to one, and only one, such block or region.

Coded Picture Buffer

Video decoding specifications (and, indirectly, corresponding encoders) may be defined to include a so-called coded picture buffer (CPB). At the decoder side, the incoming video stream is stored to the CPB in a timely manner and is read from the CPB for decoding. The specifications assume that an entire picture can be read from the CPB in a single (theoretically instantaneous) operation. At the encoder side, encoded data may similarly be stored to a CPB (theoretically at least as a single instantaneous operation to write an entire encoded picture) before being output to the output encoded video stream. However, it is at the decoder side where the CPB is defined.

The CPB can itself be defined by various aspects, including the data rate at which encoded data enters the CPB, the size of the CPB itself and potentially any delay which applies to removal of data from the CPB (defining in turn the time needed to fill the CPB such that an entire picture can be removed as discussed above).

These parameters are important to avoid CPB over filling (running out of space) and CPB underrun (running out of data to provide to the next stage of processing). Examples of the use of a CPB will be discussed below.

Parameter Sets and Encoding Levels

When video data is encoded by the techniques discussed above for subsequent decoding, it is appropriate for the encoding side of the processing to communicate some parameters of the encoding process to the eventual decoding side of the processing. Given that these encoding parameters will be needed whenever the encoded video data is decoded, it is useful to associate the parameters with the encoded video data stream itself, for example (though not necessarily exclusively, as they could be sent "out of band" by a separate transmission channel) by embedding them in the encoded video data stream itself as so-called parameter sets.

Parameter sets may be represented as a hierarchy of information, for example as video parameter sets (VPS), sequence parameter sets (SPS) and picture parameter sets (PPS). The PPS would be expected to occur once each picture and to contain information relating to all encoded slices in that picture, the SPS less often (once per sequence of pictures) and the VPS less often still. Parameter sets which occur more often (such as the PPS) can be implemented as references to previously encoded instances of that parameter set to avoid the cost of re-encoding. Each encoded image slice references a single active PPS, SPS and VPS to provide information to be used in decoding that slice. In particular, each slice header may contain a PPS identifier to reference a PPS, which in turn references an SPS, which in turn references a VPS.

Amongst these parameter sets, the SPS contains example information relevant to some of the discussion below, namely data defining the so-called profile, tier and encoding level to be used.

The profile defines a set of decoding tools or functions to be used. Example profiles include the "Main Profile" relating to 4:2:0 video at 8 bits, and the "Main 10 Profile" allowing 10 bit resolution and other extensions with respect to the Main Profile.

The encoding level provides restrictions on matters such as maximum sample rate and picture size. The tier imposes a maximum data rate.

In the JVET (Joint Video Experts Team) proposals for versatile video coding (VVC), such as those defined (at the filing date) by the specification JVET-Q2001-vE referenced above, various levels are defined from 1 to 6.2.

Example Implementation

An example implementation will now be described with reference to the drawings.

Figure 9:
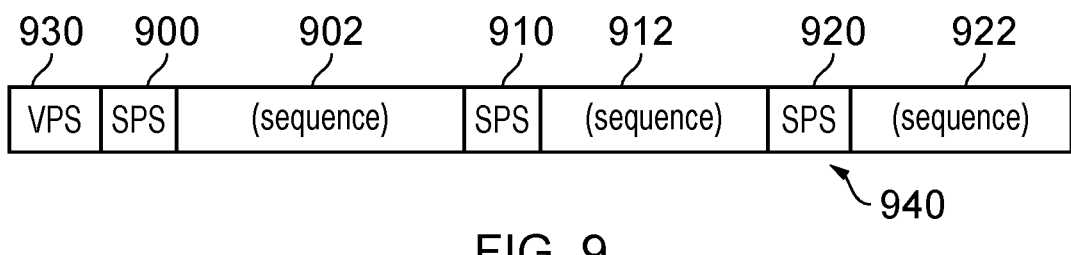
FIG. 9 schematically illustrates the use of parameter sets.

FIG. 9 schematically illustrates the use of video parameter sets and sequence parameter sets as discussed above. In particular, these form part of the hierarchy of parameter sets mentioned earlier such that multiple sequence parameter sets 900, 910, 920 may reference a video parameter set 930 and in turn be referenced themselves by respective sequences 902, 912, 922. In the example embodiments, level information applicable to the respective sequence is provided in the sequence parameter sets.

However, in other embodiments it will be appreciated that the level information could be provided in a different form or a different parameter set.

Similarly, although the schematic representation of FIG. 9 shows the sequence parameter sets being provided as part of the overall video data stream 940, the sequence parameter sets (or other data structure carrying the level information) could instead be provided by a separate communication channel. In either case, the level information is associated with the video data stream 940.

Example Operations—Decoder

Figure 10:
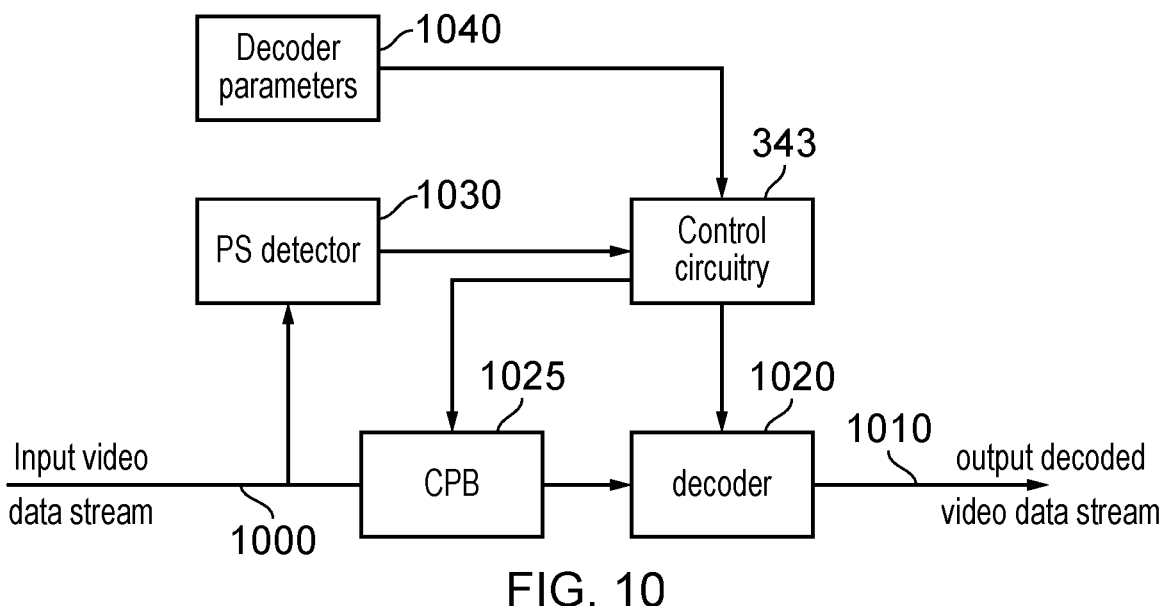
FIG. 10 schematically illustrates a decoding apparatus.

FIG. 10 schematically illustrates aspects of a decoding apparatus configured to receive an input (encoded) video data stream 1000 and to generate and output a decoded video data stream 1010 using a decoder 1020 of the form discussed above with reference to FIG. 7. For clarity of the present explanation, the control circuitry or controller 343 of FIG. 7 is drawn separately to the remainder of the decoder 1020.

Within the functionality of the controller or control circuitry 343 is a parameter set (PS) detector 1030 which detects, from appropriate fields of the input video data stream 1000, the various parameter sets including the VPS, SPS and PPS. The parameter set detector 1030 derives information from the parameter sets including the level as discussed above. This information is passed to the remainder of the control circuitry 343. Note that the parameter set detector 1030 could decode the level or could simply provide the encoded level to the control circuitry 343 for decoding.

The control circuitry 343 is also responsive to one or more decoder parameters 1040 defining at least, for example, a level which the decoder 1020 is capable of decoding.

The control circuitry 343 detects whether or not, for the given or current input video data stream 1000, the decoder 1020 is capable of decoding that input videos data stream and controls the decoder 1020 accordingly. The control circuitry 343 can also provide various other operating parameters to the decoder 1020 in response to information obtained from the parameter sets detected by the parameter set detector 1030.

FIG. 10 also shows the use of a coded picture buffer (CPB) 1025 to buffer the input video data stream 1000 before it is provided to the decoder 1020 for decoding. The control circuitry 343 controls parameters of the CPB 1025 in accordance with base parameters of the decoder 1040 and parameters derived from the parameter set decoder 1030.

FIG. 10 therefore provides an example of apparatus comprising:

a video data decoder 1020; and a coded picture buffer 1025 to buffer successive portions of an input video data stream and to provide a portion to the video data decoder for decoding, the coded picture buffer having a coded picture buffer size;

the video data decoder being responsive to parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size.

Example Operations—Encoder

Figure 11:
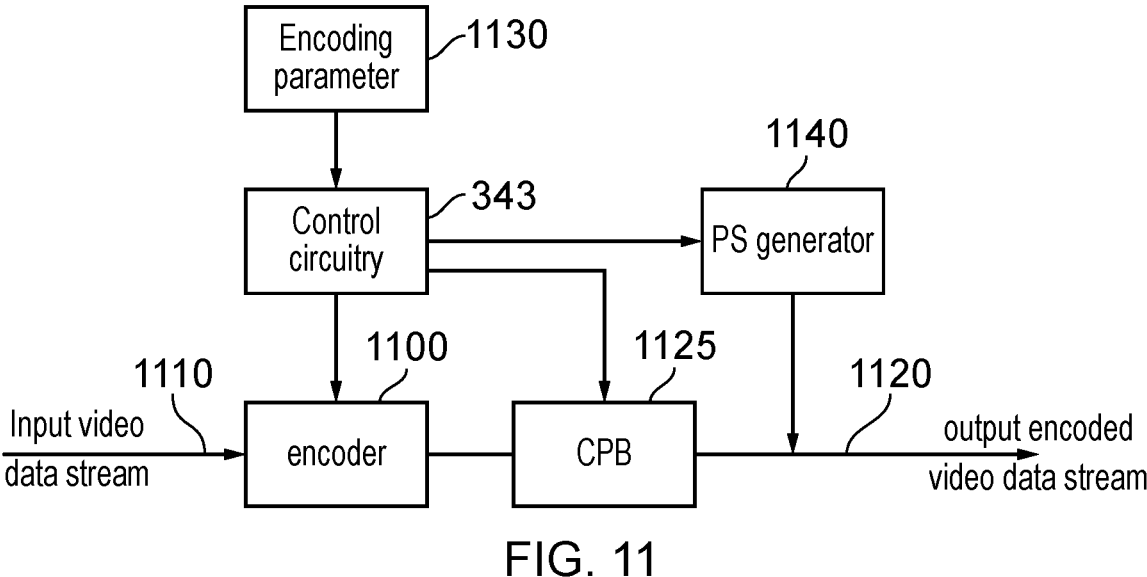
FIG. 11 schematically illustrates an encoding apparatus.

In a similar way, FIG. 11 schematically illustrates aspects of an encoding apparatus comprising an encoder 1100 of the type discussed above with reference to FIG. 7, for example. The control circuitry 343 of the encoder is drawn separately for clarity of the explanation. The encoder acts upon an input video data stream 1110 to generate and output encoded video data stream 1120 under the control of the control circuitry 343 which in turn is responsive to encoding parameters 1130 including a definition of an encoding level to be applied.

The control circuitry 343 also includes or controls a parameter set generator 1140 which generates parameter sets including, for example, the VPS, SPS and PPS to be included within the output encoded video data stream, with the SPS carrying level information encoded as described above.

In a similar manner to that described above, FIG. 11 also shows the use of a coded picture buffer (CPB) 1125 to buffer the encoded video data stream 1120 as generated by the encoder 1100. The control circuitry 343 controls parameters of the CPB 1125 in accordance with the encoding parameters 1130 and these parameters are communicated to the output encoded video data stream 1120 (and therefore to an eventual decoding stage) by the parameter set generator 1140.

This provides an example of apparatus comprising:

a video data encoder 1100; and a coded picture buffer 1125 to buffer successive portions of a current output video data stream generated by the video data encoder, the coded picture buffer having a coded picture buffer size;

the video data encoder being responsive to parameter data associated with the output video data stream, the parameter data indicating, for a given output video data stream, an encoding level selected from a plurality of encoding levels, each level defining at least a maximum luminance picture size, a minimum compression ratio and a maximum value of the coded picture buffer size.

Embodiments of the present disclosure relate to potential changes to parameters of the current VVC specification referenced above (as applicable at the time of filing) including the maximum coded picture buffer (CPB) size and the MinCRScalingFactor in order to guarantee that the buffer can always store a full picture when compressed at the minimum compression ratio (MinCR).

Background to Examples

Table A.1 in the current specification specifies the maximum coded picture buffer (CPB) size, MaxCPB, for each level. It is a requirement that a coded picture must also be stored in its entirety inside the CPB, and is at least capable of being pulled out atomically in an instant, from Annex C1 of the specification.

In addition, Table A.2 of the current specification specifies a MinCRBase, which, along with the MinCRScalingFactor, allows the minimum compression ratio (MinCR) to be calculated. MinCR is used to guarantee that a picture is compressed by at least the specified amount.

However, MinCR is not always the limiting factor. Example embodiments to be discussed below propose to either remove MinCR from the specification, or to adjust the values in Annex A to make MinCR once again useful.

For example, as shown by the analysis to be discussed below, an 8K picture coded at the minimum compression ratio of MinCR using Main 10 profile, level 6, main tier cannot be stored in the CPB; for Main 4:4:4 10 profile, this is the case for several levels.

FIG. 12 reproduces table A.1 of the current specification relating general tier and level limits. Here, the levels are shown by their level numbering in the left-hand column. A second column represents the maximum luma (or luminance) picture size. There follows a definition of a maximum CPB size (for a main tier and a high tier), to be scaled by a scaling factor as shown, a maximum number of slices the picture, a maximum number of tile rows and a maximum number of tile columns.

FIG. 13 reproduces table A.2 of the current specification which details, for each level, a maximum luma sample rate, a maximum bit rate for the main and high tier and a minimum compression ratio base for the main and high tier.

In FIG. 14, various scaling factors from table A.3 reproduced.

The table of FIG. 15 shows the max picture size, max CPB size, max coded picture size at MinCR and the minimum number of pictures in the CPB for Main 10 profile. Note that the second, fourth and sixth columns are from Table A.1 or Table A.2 in the specification; other fields are derived from these, CpbVclFactor and MinCRScaleFactor (FIG. 14).

Note that the column labelled "example max luma size" simply provides an example of a luma picture configuration which conforms with the number of samples defined by the respective max luma picture size and also with the aspect ratio constraints imposed by other parts of the current specification; this column is to assist in the present explanation and does not form part of the specification.

By way of analysis of this information, the final column provides a minimum number of coded pictures which can be stored in the CPB assuming a maximum CPB size defined by the specification and the minimum compression ratio defined by MinCRBase and MinCRScaleFactor.

Regarding FIG. 15, it can be seen that the row corresponding to level 6 is such that less than one coded picture can be stored in the CPB under these conditions.

FIG. 16 shows corresponding information for the Main 444 10 profile, and it can be seen that this issue occurs at levels 1, 3, 3.1, 4, 5 and 6.

Note that only Main tier is shown in FIGS. 15 and 16 as the same problem does not occur at High tier.

FEATURES OF EXAMPLE EMBODIMENTS

It is proposed that either MinCR constraint is removed, as it is often not required, or the values used to derive the CPB size are adjusted so that MinCR becomes always relevant again.

Example 1—Remove or Disregard MinCR

In this example, the encoder and decoder control circuitry 343 disregards the specification of the minimum compression ratio if that specification is such that, take into account all of the other current or prevailing parameters, the CPB at maximum CPB size would not be capable of holding an entire coded picture.

This therefore provides an example in which, when the minimum compression ratio defined by the encoding level applicable to the current output video stream is such that the coded picture buffer size defines a coded picture buffer insufficient to buffer a number of bits required to represent a picture at the maximum luminance picture size when encoded according to that minimum compression ratio, the video data encoder is configured to generate the current output video data stream by applying a compression ratio greater than that defined by the minimum compression ratio

Example 2—Modified Maximum CPB Size

The table of FIG. 17 shows a modified max CPB size for level 6. By allowing a larger maximum CPB size at level 6, the system is now capable of storing at least one coded picture in the CPB at the most challenging combination of conditions discussed above (minimum compression ratio, maximum coded picture size).

This therefore provides an example in which for each encoding level of the plurality of encoding levels, the maximum value of the coded picture buffer size is greater than or equal to the number of bits required to represent a picture at the maximum luminance picture size when encoded according to the minimum compression ratio.

Example 3—Main 4:4:4 10 with Adjustments to Minimum Compression Ratio

Referring to FIG. 18, measures taken for this profile relate to the adjustment of MinCRScaleFactor (to equal 0.75) as well as the same modification for level 6 MaxCPB as discussed above.

This therefore provides an example in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

Example 4—CpbVclFactor

Table A.3 specifies the CpbVclFactor for Main 444 10 to be 2.5 times that for Main 10. To keep the CpbVclFactor consistent with the FormatCapabilityFactor it is therefore proposed in this example to change the CpbVclFactor for Main 444 10 to be twice that for Main 10. It is also proposed to keep the MinCRScaleFactor at 1.0 for both profiles. These aspects are illustrated by FIG. 19.

As background, the Format Capability Factor defines the bytes per pixel of the source, so 4:4:4 has twice that of 4:2:0. It would seem neater to have the same ratio in the compressed data rather than the 2.5 currently specified. That is based on the assumption that they compress equally well, which is possible at least in circumstances in which there is not excessive chroma noise.

CpbVclFactor was 1000 for HEVC Main profile (8 bit), it was not increased for HEVC Main 10 profile when it arguably should have been. VVC has inherited these numbers from HEVC.

If this factor is reduced for 444 then it can also be appropriate to align the MinCR for the two profiles in order to still fit a full picture in the CPB.

The table of FIG. 20 shows the effect of the proposed modifications in this example.

Further Examples

The following tables provide a further example embodiment and may be considered as alternatives to the corresponding tables provided in the drawings. Reference is made to Table 135 of Appendix 4.1 of JVET-T2001-v1 of the 20$^{th}$ JVET meeting in October 2020 (the contents of which are hereby incorporated by reference):

These are further example arrangements illustrating situations similar to those shown in FIGS. 15 and 16 and described above, namely that in the main 10 profile, the row corresponding to level 6 is such that less than one coded picture can be stored in the CPB under these conditions.

| Level | Max luma picture size MaxLumaPs (samples) | Example max luma size | Max CPB size MaxCPB (CpbVclFactor or CpbNalFactor bits) Main tier | Max CPB size MaxCPB Main10 (bits) Main tier | Min compression ratio MinCrBase Main tier | Max coded luma picture size Main10 (bits @ 15bits/sample) Main tier | Min coded pictures in CPB Main10 Main tier |
|---|---|---|---|---|---|---|---|
| 1 | 36,864 | | 350 | 350,000 | 2 | 276,480 | 1.3 |
| 2 | 122,880 | | 1,500 | 1,500,000 | 2 | 921,600 | 1.6 |
| 2.1 | 245,760 | | 3,000 | 3,000,000 | 2 | 1,843,200 | 1.6 |
| 3 | 552,960 | | 6,000 | 6,000,000 | 2 | 4,147,200 | 1.4 |
| 3.1 | 983,040 | | 10,000 | 10,000,000 | 2 | 7,372,800 | 1.4 |
| 4 | 2,228,224 | 2048 × 1088 | 12,000 | 12,000,000 | 4 | 8,355,840 | 1.4 |
| 4.1 | 2,228,224 | 2048 × 1088 | 20,000 | 20,000,000 | 4 | 8,355,840 | 2.4 |
| 5 | 8,912,896 | 4096 × 2176 | 25,000 | 25,000,000 | 6 | 22,282,240 | 1.1 |
| 5.1 | 8,912,896 | 4096 × 2176 | 40,000 | 40,000,000 | 8 | 16,711,680 | 2.4 |
| 5.2 | 8,912,896 | 4096 × 2176 | 60,000 | 60,000,000 | 8 | 16,711,680 | 3.6 |
| 6 | 35,651,584 | 8192 × 4352 | 60,000 | 60,000,000 | 8 | 66,846,720 | 0.9 |
| 6.1 | 35,651,584 | 8192 × 4352 | 120,000 | 120,000,000 | 8 | 66,846,720 | 1.8 |
| 6.2 | 35,651,584 | 8192 × 4352 | 240,000 | 240,000,000 | 6 | 89,128,960 | 2.7 |

The following example table illustrates a similar situation for the Main 444 10 profile, and it can be seen that this issue occurs at levels 1, 3, 3.1, 4, 5 and 6.

| Level | Max luma picture size MaxLumaPs (samples) | Example max luma size | Max CPB size MaxCPB (CpbVclFactor or CpbNalFactor bits) Main tier | Max CPB size MaxCPB Main444_10 (bits) Main tier | Min compression ratio MinCrBase Main tier | Max coded luma picture size Main444_10 (bits @30bits/sample) Main tier | Min coded pictures in CPB Main444_10 Main tier |
|---|---|---|---|---|---|---|---|
| 1 | 36,864 | | 350 | 875,000 | 2 | 1,105,920 | 0.8 |
| 2 | 122,880 | | 1,500 | 3,750,000 | 2 | 3,686,400 | 1.0 |
| 2.1 | 245,760 | | 3,000 | 7,500,000 | 2 | 7,372,800 | 1.0 |
| 3 | 552,960 | | 6,000 | 15,000,000 | 2 | 16,588,800 | 0.9 |
| 3.1 | 983,040 | | 10,000 | 25,000,000 | 2 | 29,491,200 | 0.8 |
| 4 | 2,228,224 | 2048 × 1088 | 12,000 | 30,000,000 | 4 | 33,423,360 | 0.9 |
| 4.1 | 2,228,224 | 2048 × 1088 | 20,000 | 50,000,000 | 4 | 33,423,360 | 1.5 |
| 5 | 8,912,896 | 4096 × 2176 | 25,000 | 62,500,000 | 6 | 89,128,960 | 0.7 |
| 5.1 | 8,912,896 | 4096 × 2176 | 40,000 | 100,000,000 | 8 | 66,846,720 | 1.5 |
| 5.2 | 8,912,896 | 4096 × 2176 | 60,000 | 150,000,000 | 8 | 66,846,720 | 2.2 |
| 6 | 35,651,584 | 8192 × 4352 | 60,000 | 150,000,000 | 8 | 267,386,880 | 0.6 |
| 6.1 | 35,651,584 | 8192 × 4352 | 120,000 | 300,000,000 | 8 | 267,386,880 | 1.1 |
| 6.2 | 35,651,584 | 8192 × 4352 | 240,000 | 600,000,000 | 6 | 356,515,840 | 1.7 |

The following tables provide a proposal for addressing these issues, in a similar manner to FIGS. 17 and 18 (Main 10 and Main 444 10 respectively):

| Level | Max luma picture size MaxLumaPs (samples) | Example max luma size | Max CPB size MaxCPB (CpbVclFactor or CpbNalFactor bits) Main tier | Max CPB size MaxCPB Main10 (bits) Main tier | Min compression ratio MinCrBase Main tier | Max coded luma picture size Main10 (bits @15bits/sample) Main tier | Min coded pictures in CPB Main10 Main tier |
|---|---|---|---|---|---|---|---|
| 1 | 36,864 | | 350 | 350,000 | 2 | 276,480 | 1.3 |
| 2 | 122,880 | | 1,500 | 1,500,000 | 2 | 921,600 | 1.6 |
| 2.1 | 245,760 | | 3,000 | 3,000,000 | 2 | 1,843,200 | 1.6 |
| 3 | 552,960 | | 6,000 | 6,000,000 | 2 | 4,147,200 | 1.4 |
| 3.1 | 983,040 | | 10,000 | 10,000,000 | 2 | 7,372,800 | 1.4 |
| 4 | 2,228,224 | 2048 × 1088 | 12,000 | 12,000,000 | 4 | 8,355,840 | 1.4 |
| 4.1 | 2,228,224 | 2048 × 1088 | 20,000 | 20,000,000 | 4 | 8,355,840 | 2.4 |
| 5 | 8,912,896 | 4096 × 2176 | 25,000 | 25,000,000 | 6 | 22,282,240 | 1.1 |
| 5.1 | 8,912,896 | 4096 × 2176 | 40,000 | 40,000,000 | 8 | 16,711,680 | 2.4 |
| 5.2 | 8,912,896 | 4096 × 2176 | 60,000 | 60,000,000 | 8 | 16,711,680 | 3.6 |
| 6 | 35,651,584 | 8192 × 4352 | 80,000 | 80,000,000 | 8 | 66,846,720 | 1.2 |
| 6.1 | 35,651,584 | 8192 × 4352 | 120,000 | 120,000,000 | 8 | 66,846,720 | 1.8 |
| 6.2 | 35,651,584 | 8192 × 4352 | 240,000 | 240,000,000 | 6 | 89,128,960 | 2.7 |

| Level | Max luma picture size MaxLumaPs (samples) | Example max luma size | Max CPB size MaxCPB (CpbVclFactor or CpbNalFactor bits) Main tier | Max CPB size MaxCPB Main444_10 (bits) Main tier | Min compression ratio MinCrBase Main tier | Max coded luma picture size Main444_10 (bits @30bits/sample) Main tier | Min coded pictures in CPB Main444_10 Main tier |
|---|---|---|---|---|---|---|---|
| 1 | 36,864 | | 350 | 875,000 | 2 | 737,280 | 1.2 |
| 2 | 122,880 | | 1,500 | 3,750,000 | 2 | 2,457,600 | 1.5 |
| 2.1 | 245,760 | | 3,000 | 7,500,000 | 2 | 4,915,200 | 1.5 |
| 3 | 552,960 | | 6,000 | 15,000,000 | 2 | 11,059,200 | 1.4 |
| 3.1 | 983,040 | | 10,000 | 25,000,000 | 2 | 19,660,800 | 1.3 |
| 4 | 2,228,224 | 2048 × 1088 | 12,000 | 30,000,000 | 4 | 22,282,240 | 1.3 |
| 4.1 | 2,228,224 | 2048 × 1088 | 20,000 | 50,000,000 | 4 | 22,282,240 | 2.2 |
| 5 | 8,912,896 | 4096 × 2176 | 25,000 | 62,500,000 | 6 | 59,419,307 | 1.1 |
| 5.1 | 8,912,896 | 4096 × 2176 | 40,000 | 100,000,000 | 8 | 44,564,480 | 2.2 |
| 5.2 | 8,912,896 | 4096 × 2176 | 60,000 | 150,000,000 | 8 | 44,564,480 | 3.4 |
| 6 | 35,651,584 | 8192 × 4352 | 80,000 | 200,000,000 | 8 | 178,257,920 | 1.1 |
| 6.1 | 35,651,584 | 8192 × 4352 | 120,000 | 300,000,000 | 8 | 178,257,920 | 1.7 |
| 6.2 | 35,651,584 | 8192 × 4352 | 240,000 | 600,000,000 | 6 | 237,677,227 | 2.5 |

20

The following tables provide a further proposal for addressing these issues, in a similar manner to FIGS. 17 and 18 (Main 10 and Main 444 10 respectively):

| Level | Max luma picture size MaxLumaPs (samples) | Example max luma size | Max CPB size MaxCPB (CpbVclFactor or CpbNalFactor bits) Main tier | Max CPB size MaxCPB Main10 (bits) Main tier | Min compression ratio MinCrBase Main tier | Max coded luma picture size Main10 (bits @15bits/sample) Main tier | Min coded pictures in CPB Main10 Main tier |
|---|---|---|---|---|---|---|---|
| 1 | 36,864 | | 350 | 350,000 | 2 | 276,480 | 1.3 |
| 2 | 122,880 | | 1,500 | 1,500,000 | 2 | 921,600 | 1.6 |
| 2.1 | 245,760 | | 3,000 | 3,000,000 | 2 | 1,843,200 | 1.6 |
| 3 | 552,960 | | 6,000 | 6,000,000 | 2 | 4,147,200 | 1.4 |
| 3.1 | 983,040 | | 10,000 | 10,000,000 | 2 | 7,372,800 | 1.4 |
| 4 | 2,228,224 | 2048 × 1088 | 12,000 | 12,000,000 | 4 | 8,355,840 | 1.4 |
| 4.1 | 2,228,224 | 2048 × 1088 | 20,000 | 20,000,000 | 4 | 8,355,840 | 2.4 |
| 5 | 8,912,896 | 4096 × 2176 | 25,000 | 25,000,000 | 6 | 22,282,240 | 1.1 |
| 5.1 | 8,912,896 | 4096 × 2176 | 40,000 | 40,000,000 | 8 | 16,711,680 | 2.4 |
| 5.2 | 8,912,896 | 4096 × 2176 | 60,000 | 60,000,000 | 8 | 16,711,680 | 3.6 |
| 6 | 35,651,584 | 8192 × 4352 | 80,000 | 80,000,000 | 8 | 66,846,720 | 1.2 |
| 6.1 | 35,651,584 | 8192 × 4352 | 120,000 | 120,000,000 | 8 | 66,846,720 | 1.8 |
| 6.2 | 35,651,584 | 8192 × 4352 | 180,000 | 180,000,000 | 8 | 66,846,720 | 2.7 |

| Level | Max luma picture size MaxLumaPs (samples) | Example max luma size | Max CPB size MaxCPB (CpbVclFactor or CpbNalFactor bits) Main tier | Max CPB size MaxCPB Main444_10 (bits) Main tier | Min compression ratio MinCrBase Main tier | Max coded luma picture size Main444_10 (bits @30bits/sample) Main tier | Min coded pictures in CPB Main444_10 Main tier |
|---|---|---|---|---|---|---|---|
| 1 | 36,864 | | 350 | 875,000 | 2 | 737,280 | 1.2 |
| 2 | 122,880 | | 1,500 | 3,750,000 | 2 | 2,457,600 | 1.5 |
| 2.1 | 245,760 | | 3,000 | 7,500,000 | 2 | 4,915,200 | 1.5 |
| 3 | 552,960 | | 6,000 | 15,000,000 | 2 | 11,059,200 | 1.4 |
| 3.1 | 983,040 | | 10,000 | 25,000,000 | 2 | 19,660,800 | 1.3 |
| 4 | 2,228,224 | 2048 × 1088 | 12,000 | 30,000,000 | 4 | 22,282,240 | 1.3 |
| 4.1 | 2,228,224 | 2048 × 1088 | 20,000 | 50,000,000 | 4 | 22,282,240 | 2.2 |
| 5 | 8,912,896 | 4096 × 2176 | 25,000 | 62,500,000 | 6 | 59,419,307 | 1.1 |
| 5.1 | 8,912,896 | 4096 × 2176 | 40,000 | 100,000,000 | 8 | 44,564,480 | 2.2 |
| 5.2 | 8,912,896 | 4096 × 2176 | 60,000 | 150,000,000 | 8 | 44,564,480 | 3.4 |
| 6 | 35,651,584 | 8192 × 4352 | 80,000 | 200,000,000 | 8 | 178,257,920 | 1.1 |
| 6.1 | 35,651,584 | 8192 × 4352 | 120,000 | 300,000,000 | 8 | 178,257,920 | 1.7 |
| 6.2 | 35,651,584 | 8192 × 4352 | 180,000 | 450,000,000 | 8 | 178,257,920 | 2.5 |

Each of these alternative embodiments (and indeed each of the embodiments discussed above) may be considered as lying withing the scope of the appended claims.

Encoded Video Data

Video data encoded by any of the techniques disclosed here is also considered to represent an embodiment of the present disclosure.

Summary Methods

Figures 21, 22, 23:
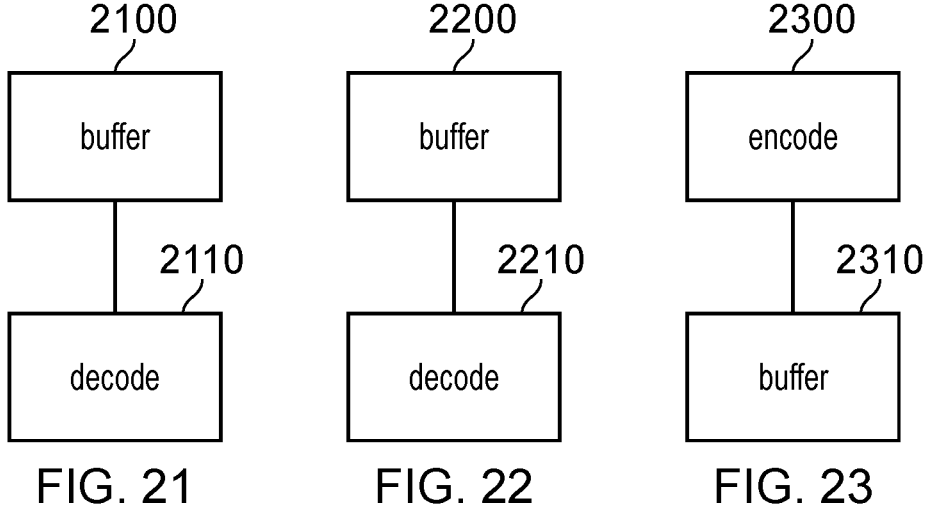
FIGS. 21 to 25 are schematic flowcharts illustrating respective methods.

FIG. 21 is a schematic flowchart illustrating a method comprising:

buffering (at a step 2100) input video data in a coded picture buffer to buffer successive portions of an input video data stream and to provide a portion to the video data decoder for decoding, the coded picture buffer having a coded picture buffer size; and decoding (at a step 2110) a portion of the input video data stream in response parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;

in which for each encoding level of the plurality of encoding levels, the maximum value of the coded picture buffer size is greater than or equal to the number of bits required to represent a picture at the maximum luminance picture size when encoded according to the minimum compression ratio.

FIG. 22 is a schematic flowchart illustrating a method comprising:

buffering (at a step 2200) input video data in a coded picture buffer to buffer successive portions of an input video data stream and to provide a portion to the video data decoder for decoding, the coded picture buffer having a coded picture buffer size;

decoding (at a step 2210) the input video data stream in response to parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;

in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

FIG. 23 is a schematic flowchart illustrating a method comprising:

encoding (at a step 2300) an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and buffering (at a step 2310) the encoded output video data stream in a coded picture buffer configured to buffer successive portions of the output encoded video data stream generated by the encoding step, the coded picture buffer having a coded picture buffer size;

in which, when the minimum compression ratio defined by the encoding level applicable to the current output video stream is such that the coded picture buffer size defines a coded picture buffer insufficient to buffer a number of bits required to represent a picture at the maximum luminance picture size when encoded according to that minimum compression ratio, the encoding step comprises generating the output encoded video data stream by applying a compression ratio greater than that defined by the minimum compression ratio.

Figures 24, 25:
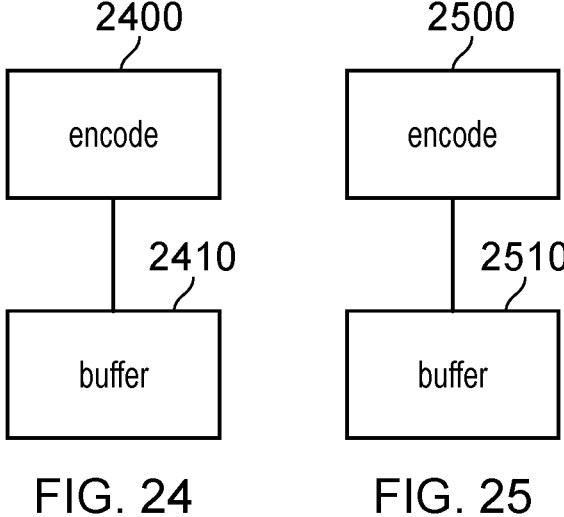

FIG. 24 is a schematic flowchart illustrating a method comprising:

encoding (at a step 2400) an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and buffering (at a step 2410) the encoded output video data stream in a coded picture buffer configured to buffer successive portions of the output encoded video data stream generated by the encoding step, the coded picture buffer having a coded picture buffer size;

in which for each encoding level of the plurality of encoding levels, the maximum value of the coded picture buffer size is greater than or equal to the number of bits required to represent a picture at the maximum luminance picture size when encoded according to the minimum compression ratio.

FIG. 25 is a schematic flowchart illustrating a method comprising:

encoding (at a step 2500) an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and buffering (at a step 2510) the encoded output video data stream in a coded picture buffer configured to buffer successive portions of the output encoded video data stream generated by the encoding step, the coded picture buffer having a coded picture buffer size;

in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments. Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Respective aspects and features are defined by the following numbered clauses:

1. Apparatus comprising:
   a video data decoder; and
   a coded picture buffer to buffer successive portions of an input video data stream and to provide a portion to the video data decoder for decoding, the coded picture buffer having a coded picture buffer size;
   the video data decoder being responsive to parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;
   in which for each encoding level of the plurality of encoding levels, the maximum value of the coded picture buffer size is greater than or equal to the number of bits required to represent a picture at the maximum luminance picture size when encoded according to the minimum compression ratio.

2. The apparatus of clause 1, in which the portions are portions of data representing entire pictures.

3. Video storage, capture, transmission or reception apparatus comprising the apparatus of clause 1.

4. A method comprising:
   buffering input video data in a coded picture buffer to buffer successive portions of an input video data stream and to provide a portion to the video data decoder for decoding, the coded picture buffer having a coded picture buffer size; and
decoding a portion of the input video data stream in response parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;
in which for each encoding level of the plurality of encoding levels, the maximum value of the coded picture buffer size is greater than or equal to the number of bits required to represent a picture at the maximum luminance picture size when encoded according to the minimum compression ratio.

5. Computer software which, when executed by a computer, causes the computer to carry out the method of clause 4.

6. A machine-readable non-transitory storage medium which stores the computer software of clause 5.

7. Apparatus comprising:
   a video data decoder; and
   a coded picture buffer to buffer successive portions of an input video data stream and to provide a portion to the video data decoder for decoding, the coded picture buffer having a coded picture buffer size;
   the video data decoder being responsive to parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;
   in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

8. The apparatus of clause 7, in which the portions are portions of data representing entire pictures.

9. Video storage, capture, transmission or reception apparatus comprising the apparatus of clause 7.

10. A method comprising:
    buffering input video data in a coded picture buffer to buffer successive portions of an input video data stream and to provide a portion to the video data decoder for decoding, the coded picture buffer having a coded picture buffer size; and
    decoding the input video data stream in response to parameter data associated with the input video data stream, the parameter data indicating, for a given input video data stream, an encoding level selected from a plurality of encoding levels, each level defining at least a maximum luminance picture size, a minimum compression ratio and a maximum value of the coded picture buffer size;
    in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

11. Computer software which, when executed by a computer, causes the computer to carry out the method of clause 10.

12. A machine-readable non-transitory storage medium which stores the computer software of clause 11.

13. Apparatus comprising:
   a video data encoder; and
   a coded picture buffer to buffer successive portions of a current output video data stream generated by the video data encoder, the coded picture buffer having a coded picture buffer size;
   the video data encoder being responsive to parameter data associated with the output video data stream, the parameter data indicating, for a given output video data stream, an encoding level selected from a plurality of encoding levels, each level defining at least a maximum luminance picture size, a minimum compression ratio and a maximum value of the coded picture buffer size;
   in which, when the minimum compression ratio defined by the encoding level applicable to the current output video stream is such that the coded picture buffer size defines a coded picture buffer insufficient to buffer a number of bits required to represent a picture at the maximum luminance picture size when encoded according to that minimum compression ratio, the video data encoder is configured to generate the current output video data stream by applying a compression ratio greater than that defined by the minimum compression ratio.

14. The apparatus of clause 13, in which the portions are portions of data representing entire pictures.

15. Video storage, capture, transmission or reception apparatus comprising the apparatus of clause 13.

16. A method comprising:
   encoding an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and
   buffering the encoded output video data stream in a coded picture buffer configured to buffer successive portions of the output encoded video data stream generated by the encoding step, the coded picture buffer having a coded picture buffer size;
   in which, when the minimum compression ratio defined by the encoding level applicable to the current output video stream is such that the coded picture buffer size defines a coded picture buffer insufficient to buffer a number of bits required to represent a picture at the maximum luminance picture size when encoded according to that minimum compression ratio, the encoding step comprises generating the output encoded video data stream by applying a compression ratio greater than that defined by the minimum compression ratio.

17. Computer software which, when executed by a computer, causes the computer to carry out the method of clause 16.

18. A machine-readable non-transitory storage medium which stores the computer software of clause 17.

19. Apparatus comprising:
   a video data encoder; and
   a coded picture buffer to buffer successive portions of a current output video data stream generated by the video data encoder, the coded picture buffer having a coded picture buffer size;
   the video data encoder being responsive to parameter data associated with the output video data stream, the parameter data indicating, for a given output video data stream, an encoding level selected from a plurality of encoding levels, each level defining at least a maximum luminance picture size, a minimum compression ratio and a maximum value of the coded picture buffer size;
   in which for each encoding level of the plurality of encoding levels, the maximum value of the coded picture buffer size is greater than or equal to the number of bits required to represent a picture at the maximum luminance picture size when encoded according to the minimum compression ratio.

20. The apparatus of clause 19, in which the portions are portions of data representing entire pictures.

21. Video storage, capture, transmission or reception apparatus comprising the apparatus of clause 19.

22. A method comprising:
   encoding an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and
   buffering the encoded output video data stream in a coded picture buffer configured to buffer successive portions of the output encoded video data stream generated by the encoding step, the coded picture buffer having a coded picture buffer size;
   in which for each encoding level of the plurality of encoding levels, the maximum value of the coded picture buffer size is greater than or equal to the number of bits required to represent a picture at the maximum luminance picture size when encoded according to the minimum compression ratio.

23. Computer software which, when executed by a computer, causes the computer to carry out the method of clause 22.

24. A machine-readable non-transitory storage medium which stores the computer software of clause 23.

25. Apparatus comprising:
   a video data encoder; and
   a coded picture buffer to buffer successive portions of a current output video data stream generated by the video data encoder, the coded picture buffer having a coded picture buffer size;
   the video data encoder being responsive to parameter data associated with the output video data stream, the parameter data indicating, for a given output video data stream, an encoding level selected from a plurality of encoding levels, each level defining at least a maximum luminance picture size, a minimum compression ratio and a maximum value of the coded picture buffer size;
   in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

26. The apparatus of clause 25, in which the portions are portions of data representing entire pictures.

27. Video storage, capture, transmission or reception apparatus comprising the apparatus of clause 25.

28. A method comprising:

encoding an input video data stream to generate an output encoded video data stream in response to parameter data associated with the output encoded video data stream, the parameter data indicating, for a given output encoded video data stream, an encoding level selected from a plurality of encoding levels, each level defining at least a maximum luminance picture size, a minimum compression ratio and a maximum value of the coded picture buffer size; and buffering the encoded output video data stream in a coded picture buffer configured to buffer successive portions of the output encoded video data stream generated by the encoding step, the coded picture buffer having a coded picture buffer size;

in which for each encoding level of the plurality of encoding levels, the minimum compression ratio is such that the coded picture buffer size defines a coded picture buffer sufficient to buffer a number of bits required to represent a picture at the maximum luminance picture size when encoded according to the minimum compression ratio.

29. Computer software which, when executed by a computer, causes the computer to carry out the method of clause 28.

30. A machine-readable non-transitory storage medium which stores the computer software of clause 29.

The invention claimed is:

1. An apparatus comprising:

circuitry configured as:

a video data decoder; and a coded picture buffer to buffer successive portions of an input video data stream and to provide a portion to the video data decoder for decoding, the coded picture buffer having a coded picture buffer size, wherein the video data decoder is responsive to parameter data associated with the input video data stream, the parameter data indicating, for a given input video data stream, an encoding level selected from all encoding levels specified in a coding specification, each encoding level of all of the encoding levels specified in the coding specification defining at least a maximum luminance picture size, a minimum compression ratio, and a maximum value of the coded picture buffer size, for each encoding level of all of the encoding levels specified in the coding specification, the defined maximum value of the coded picture buffer size is greater than or equal to the number of bits required to represent a picture at the maximum luminance picture size when encoded according to the minimum compression ratio, and for level 6, Main Tier, the defined maximum value of the coded picture buffer size is 80,000 bits.

2. The apparatus of claim 1, wherein the portion includes portions of data representing entire pictures.

3. The apparatus of claim 1, wherein the apparatus is disposed within a video storage, capture, transmission, or reception system.

4. The apparatus of claim 1, wherein the encoding levels include at least levels from 1 to 6.2.

5. The apparatus of claim 1, wherein the encoding levels include level 6.

6. The apparatus of claim 1, wherein for each encoding level of all of the encoding levels of the coding specification, the maximum value of the coded picture buffer size is greater than or equal to the number of bits required to represent a picture at the most challenging combination of coding conditions, which include the minimum compression ratio and maximum coded picture size.

7. The apparatus of claim 6, wherein the most challenging combination of conditions includes an 8K picture coded at the minimum compression ratio using the Main 10 profile or using the Main 4:4:4 10 profile.

8. The apparatus of claim 1, wherein for at least two levels of all of the encoding levels specified in the coding specification, the defined maximum value of the coded picture buffer size is greater than a maximum bitrate for the corresponding level.

9. A method comprising:

buffering input video data in a coded picture buffer to buffer successive portions of an input video data stream and to provide a portion for decoding, the coded picture buffer having a coded picture buffer size; and decoding, by circuitry, a portion of the input video data stream in response parameter data associated with the input video data stream, the parameter data indicating, for a given input video data stream, an encoding level selected from all encoding levels specified in a coding specification, each encoding level of all of the encoding levels specified in the coding specification defining at least a maximum luminance picture size, a minimum compression ratio, and a maximum value of the coded picture buffer size, wherein for each encoding level of all of the encoding levels specified in the coding specification, the defined maximum value of the coded picture buffer size is greater than or equal to the number of bits required to represent a picture at the maximum luminance picture size when encoded according to the minimum compression ratio, and for level 6, Main Tier, the defined maximum value of the coded picture buffer size is 80,000 bits.

10. The method of claim 9, wherein the coding specification is an ITU-T Versatile Video coding specification.

11. A non-transitory storage medium comprising executable computer code components which, when executed by a computer, cause the computer to carry out the method of claim 9.

12. An apparatus comprising:

circuitry configured as:

a video data encoder; and a coded picture buffer to buffer successive portions of a current output video data stream generated by the video data encoder, the coded picture buffer having a coded picture buffer size, wherein the video data encoder is responsive to parameter data associated with the output video data stream, the parameter data indicating, for a given output video data stream, an encoding level selected from all encoding levels specified in a coding specification, each encoding level of all of the encoding levels specified in the coding specification defining at least a maximum luminance picture size, a minimum compression ratio, and a maximum value of the coded picture buffer size, for each encoding level of all of the encoding levels specified in the coding specification, the defined maximum value of the coded picture buffer size is greater than or equal to the number of bits required to represent a picture at the maximum luminance picture size when encoded according to the minimum compression ratio, and for level 6, Main Tier, the defined maximum value of the coded picture buffer size is 80,000 bits.

13. The apparatus of claim 12, wherein the portion includes portions of data representing entire pictures.

14. The apparatus of claim 12, wherein the apparatus is disposed within a video storage, capture, transmission, or reception system.

15. The apparatus of claim 12, wherein the encoding levels include at least levels from 1 to 6.2.

16. The apparatus of claim 12, wherein the encoding levels include level 6.

17. The apparatus of claim 12, wherein for each encoding level of all of the encoding levels of the coding specification, the maximum value of the coded picture buffer size is greater than or equal to the number of bits required to represent a picture at the most challenging combination of coding conditions, which include the minimum compression ratio and maximum coded picture size.

18. The apparatus of claim 17, wherein the most challenging combination of conditions includes an 8K picture coded at the minimum compression ratio using the Main 10 profile or using the Main 4:4:4 10 profile.

19. A method comprising:

encoding, by circuitry, an input video data stream to generate an output encoded video data stream in response to parameter data associated with the output encoded video data stream, the parameter data indicating, for a given output encoded video data stream, an encoding level selected from all encoding levels specified in a coding specification, each encoding level of all of the encoding levels specified in the coding specification defining at least a maximum luminance picture size, a minimum compression ratio, and a maximum value of the coded picture buffer size; and buffering the encoded output video data stream in a coded picture buffer configured to buffer successive portions of the output encoded video data stream generated by the encoding step, the coded picture buffer having the coded picture buffer size, wherein for each encoding level of all of the encoding levels specified in the coding specification, the defined maximum value of the coded picture buffer size is greater than or equal to the number of bits required to represent a picture at the maximum luminance picture size when encoded according to the minimum compression ratio, and for level 6, Main Tier, the defined maximum value of the coded picture buffer size is 80,000 bits.

20. A non-transitory storage medium comprising executable computer code components which, when executed by a computer, cause the computer to carry out the method of claim 19.

* * * * *